United States Patent [19]

Beusch

[11] Patent Number: 5,665,969
[45] Date of Patent: Sep. 9, 1997

[54] X-RAY DETECTOR AND METHOD FOR MEASURING ENERGY OF INDIVIDUAL X-RAY PHOTONS FOR IMPROVED IMAGING OF SUBJECTS USING REDUCED DOSE

[75] Inventor: John U. Beusch, Stow, Mass.

[73] Assignee: Massachusetts Institute of Technology, Cambridge, Mass.

[21] Appl. No.: 744,220

[22] Filed: Nov. 14, 1996

Related U.S. Application Data

[63] Continuation of Ser. No. 483,193, Jun. 7, 1995, abandoned.
[51] Int. Cl.$^6$ ........................................... G01T 1/29
[52] U.S. Cl. .............................. 250/370.09; 378/98.8
[58] Field of Search ..................... 250/370.09, 370.07; 378/98.2, 98.8; 257/445; 348/297

[56] References Cited

U.S. PATENT DOCUMENTS

| | | | |
|---|---|---|---|
| 4,245,158 | 1/1981 | Burstein et al. | 250/370.09 |
| 4,472,728 | 9/1984 | Grant et al. | 357/30 |
| 4,618,975 | 10/1986 | Glantschnig | 378/51 |
| 4,937,453 | 6/1990 | Nelson | 250/370.09 |
| 4,945,552 | 7/1990 | Ueda et al. | 378/99 |
| 5,043,582 | 8/1991 | Lox et al. | 250/370.09 |
| 5,117,114 | 5/1992 | Street et al. | 250/370.11 |
| 5,148,030 | 9/1992 | Kiri et al. | 250/370.09 |
| 5,150,394 | 9/1992 | Karellas | 378/62 |
| 5,182,624 | 1/1993 | Tran et al. | 250/370.09 |
| 5,245,191 | 9/1993 | Barber et al. | 250/363.04 |
| 5,293,195 | 3/1994 | Berlad et al. | 364/413.24 |
| 5,434,417 | 7/1995 | Nygren | 250/370.09 |
| 5,465,284 | 11/1995 | Karellas | 378/62 |

FOREIGN PATENT DOCUMENTS

WO92/14169  8/1992  WIPO.

OTHER PUBLICATIONS

Van Trees, Harry L., Detection, Estimation, and Modulation Theory Part I (New York: John Wiley & Sons, 1968 (pp. 19–133).

Hubbell, J.H., Poton Cross Sections, Attenuation Coefficients, and Energy Absorption Coefficients from 10KeV to 100 GeV, National Bureau of Standards #29, vol. 26–30, p. 73.

Beynon, J.D.E. and Lamb, D.R. (editors), Charge–Coupled Devices and their Applications McGraw–Hill Book Company (UK) Limited, p. 96.

Rogatto, William D., Editor, The Infrared & Electro–Optical Systems Handbook, vol. 3, Electro–Optical Components, pp. 225, 287–340, 1994, SPIE Optical Engineering Press, Bellingham, WA, USA.

Holdsworth, D.W. et al., "Slot–Beam Digital Mammography Using a Time–Delay Integration (TDI) CCD," SPIE vol. 1090, Medical Imaging III: Image Formation (1989) pp. 306–313.

Burke, Barry E. et al, "An Abuttable CCD Imager for Visible and X–ray Focal Plane Arrays" IEEE Transactions on Electro Devices, vol. 38, No. 5, May 1991, pp. 1069–1076.

(List continued on next page.)

*Primary Examiner*—Kiet T. Nguyen
*Attorney, Agent, or Firm*—Wolf, Greenfield & Sacks, P.C.

[57] ABSTRACT

An x-ray detector is designed to operate as an imaging spectrometer for imaging of a subject. The x-ray detector measures energy of individual x-ray photons in each of a plurality of pixels in the x-ray detector. The pixels of the x-ray detector are readout at a rate such that the likelihood of arrive of more than one x-ray photon in each pixel during a readout period is negligible. Because x-ray photons with different energy levels will create different magnitude responses in the x-ray detector, the measurements made by the x-ray detector can be weighted according to the energy level of the detected x-ray photons. Thus, responses due to noise or x-ray photons which contribute little or no x-ray attenuation information can be discarded or weighted to eliminate or reduce their effect on any resulting image. Conversely, measurements due to x-ray photons which provide significant attenuation information can be weighted significantly.

31 Claims, 4 Drawing Sheets

OTHER PUBLICATIONS

Turchetta, R. et al., "High Spatial Resolution Silicon Read–Out System for Single Photon X–tray Detection," IEEE Conference Record, Nuclear Science Symposium and Medical Imaging Conference, vol. 1, May 1994, pp. 435–439.

Prensky, S.D. and Seidman, A.H., Linear Integrated Circuits, Reston Publishing Company, Inc., Prentice Hall, 1981.

X-RAY DETECTOR AND METHOD FOR MEASURING ENERGY OF INDIVIDUAL X-RAY PHOTONS FOR IMPROVED IMAGING OF SUBJECTS USING REDUCED DOSE

This application is a continuation of application Ser. No. 08/483,193, filed Jun. 7, 1995, now abandoned.

This invention was made with government support under Contract Number F19628-95-C-0002 awarded by the U.S. Air Force. The government has certain rights in the invention.

FIELD OF THE INVENTION

This invention relates to x-ray detectors and methods for detecting x-ray photons. More particularly, the invention relates to measurement of energy of individual x-ray photons, and the use of such measurement for improved imaging of subjects.

BACKGROUND OF THE INVENTION

Radiographic imaging involves the measurement of the attenuation of x-ray radiation by a subject and the weighting or processing of such measurements to provide a two-dimensional image of the subject. The process has been known since approximately the time of discovery of x-rays in 1895. The subject is usually a portion of a human or animal, such as a chest, teeth, abdomen, or breast, or a portion of a structure or object, but may be an entire human, animal, structure or object. In addition, a substance may be introduced into the subject, such as a contrast agent, to improve contrast in the resulting image. Radiographic imaging is generally used for characterization of the subject, such as detection of the presence or absence, estimation of the size, or estimation of any other geometrical or physical property of any part of the subject, including but not limited to tumors, calcifications, organs, portions of organs, features, boundaries, foreign substances or anomalies, for diagnostic, medical, dental, testing and other purposes of a user. The term user is employed to denote any individual who is characterizing the subject, such as medical or dental professionals or paraprofessionals, engineers, and operators of equipment under their guidance.

In its simplest form, radiographic imaging is conducted by providing a source of x-ray radiation, the subject and a detector which serves to detect and record the radiation transmitted through the subject during the total exposure time to the x-ray radiation. The most common and simplest form of detector is x-ray sensitive photographic film. In a conventional radiographic imaging system, radiation is transmitted through the subject and then is detected by a substantially two-dimensional plane of x-ray sensitive film. Frequently a film-screen combination replaces the x-ray film. In digital radiographic imaging or digital radiography other detectors are employed, such as an image intensifier combined with a television-scan or charge-coupled device (CCD) camera, or a combination of a screen and CCD and others.

Commonly-available x-ray detector configurations include point scan, slit scan, and slot scan systems and fixed two-dimensional image receptors, optionally with fiber optic or lens adjuncts. These adjuncts direct visible light photons to the detector when a screen is employed to transform x-ray photons to visible light. Scanning devices are used because the division of two-dimensional image receptors and corresponding x-ray illuminators into a plurality of sub-arrays allows the use of narrow x-ray beams, which in turn reduces undesirable effects of scattered radiation, and because a sub-array requires a smaller detector than a complete array.

In commonly-used medical radiographic imaging devices, including digital radiography systems, the quantity measured in the x-ray detectors for each picture element (pixel) of the two-dimensional image (and used for display or further processing) is the total energy absorbed by the detector over the total exposure time, with some efficiency less than 100 percent. This total energy in each pixel is related to the response of the detector to all x-ray photons of different energy levels bombarding the pixel at different times. Additionally, some detectors, particularly film, have a non-linear response to the energy level of the x-ray photons detected. The effect is that the total energy measured includes a non-linear weighting factor in which high energy x-ray photons are weighted more than lower energy x-ray photons.

That an x-ray image is based on the sum of the responses of all x-ray photons transmitted through the subject is a problem because some of the x-ray photons emitted by the x-ray source have a high energy which are almost never attenuated by the subject. These x-ray photons thus contribute essentially little or no useful information. Other x-ray photons have an energy level such that they are only seldom attenuated, and thus provide little information. In contrast, the passage of a lower energy photon through the subject is less likely, but often provides more information. By including the response due to x-ray photons which provide little information, the quality of the resulting image is reduced.

SUMMARY OF THE INVENTION

Radiographic imaging can be improved by detecting and measuring the energy of individual x-ray photons. This individual measurement is performed by making a device called an imaging spectrometer, which can be implemented by a device which reads the response of each pixel of an x-ray detector at a rate, defined by a time period, such that at most one x-ray photon hits the pixel in the time period, to some statistical certainty. The time period for reading the response of each pixel is defined by the x-ray photon flux of the x-ray source and subject and the size of each pixel.

With the knowledge of the number of x-ray photons and their respective energy levels which impact each pixel, a variety of functions can be provided which, with a very high probability, will improve the resulting image, given the same x-ray dose. Additionally, a reduced dose can be used to obtain the same image quality image.

For example, the response of a pixel of the detector may be weighted according to the measured energy level of the detected x-ray photon. Generally, the response due to some x-ray photons may provide less information than the response due to x-ray photons of other energy levels and should be weighted accordingly. In particular, because x-ray photons of lower energy levels are more important in medical imaging of soft tissue than x-ray photons of higher energy, weighting may be used to emphasize this importance in such an application. As a result of weighting, still better information can be obtained using the same dose of radiation, or a reduced dose may be used to obtain the same quality result.

Accordingly, one aspect of the present invention is an x-ray detector for providing a measure of energy of individual x-ray photons from a source which emits x-ray photons having a plurality of energy levels. The x-ray detector includes a detection mechanism which generates a response to an x-ray photon as a function of the energy of the x-ray photon, wherein the response is generated in each of a plurality of pixels in response to x-ray photons impacting the individual pixels. A readout circuit connected to the detector unit reads out the response of each pixel at a readout rate defined by a period, wherein the likelihood of arrival of more than one x-ray photon in one pixel in one period is negligible.

In a particular embodiment of this aspect of the invention, the readout circuit includes a plurality of register readout cells, wherein each register readout cell is connected to a corresponding pixel in the detection mechanism. A readout controller is connected to transfer, at the readout rate, the response in pixels of the detection mechanism into the register readout cells corresponding to the pixels.

In another embodiment of this aspect of the invention, the detection mechanism includes a coupling mechanism which generates a response to an x-ray photon as a function of energy of the x-ray photon. The coupling mechanism is divided into picture elements, each picture element having a separably determinable response and defining the pixels of the detection mechanism. A plurality of detector cells are also provided, wherein each detector cell is connected to a corresponding pixel in the coupling mechanism into which the response of the corresponding pixel in the coupling mechanism is transferred. In an embodiment in which the readout circuit has register readout cells, the register readout cells are connected to the detector cells. In some embodiments, an interconnection device is connected to the coupling mechanism to transfer the response between picture elements in the coupling mechanism and the corresponding detector cells.

Another aspect of the invention is a method for detecting x-rays to provide a measure of energy of individual x-ray photons from a source which emits x-ray photons having a plurality of energy levels. The method involves generating a response in a detection mechanism in response to an x-ray photon as a function of the energy of the x-ray photon, wherein the response is generated in each of a plurality of pixels in the detection mechanism in response to x-ray photons impacting the individual pixels. The response of each pixel is read out at a rate defined by a period wherein the likelihood of arrival of more than one x-ray photon in one pixel in one period is negligible.

Another aspect of the invention is an apparatus for detecting x-rays to provide a measure of energy of individual x-ray photons from a source which emits x-ray photons having a plurality of energy levels. The apparatus includes a device which generates a response to an x-ray photon as a function of the energy of the x-ray photon, wherein the response is generated in each of a plurality of pixels in response to x-ray photons impacting the individual pixels. A device reads out the response of each pixel at a rate defined by a period wherein the likelihood of arrival of more than one x-ray photon in one pixel in one period is negligible.

In some embodiments of the x-ray detector in accordance with the invention, a weighting circuit is provided which has an input connected to receive responses read out from the pixels and an output providing a weighted response for each received response. A summation circuit is connected to the output of the weighting circuit which accumulates, for each pixel, a sum of weighted responses of the pixel. The weighting circuit may perform a weighting function according to the magnitude of the response of the pixel. In particular, the weighting function may weight responses indicative of an x-ray photon of lower energy more significantly than responses indicative of an x-ray photon of higher energy.

The x-ray detector may have a coupling mechanism made of a semiconductor, such as silicon, as in a silicon microstrip detector. In such an embodiment, the response of the coupling mechanism is a charge, which is typically proportional to the energy of the x-ray photon. Alternatively, the coupling mechanism may generate light, such as a phosphorous screen. The silicon coupling mechanism may connect to a readout circuit, such as a charge-coupled device embodied in an integrated circuit, via an electrical interconnect such as Indium bumps.

In some embodiments of the invention, pixels are read out into readout cells which are organized into a shift register. A readout controller transfers response from a portion of the pixels to their corresponding register readout cells in parallel. The readout controller transfers responses from the register readout cells serially through an output register cell.

Generally speaking, the x-ray detector is designed for use in medical and other kinds of radiographic imaging systems which are used to characterize a subject. In such applications, the x-ray source typically provides an x-ray photon flux of several hundred to several thousand x-ray photons per square millimeter per millisecond. In medical applications, the x-ray source emits x-rays of energy levels primarily between 10 KeV and 40 KeV to 150 KeV or even higher.

Another aspect of the invention is an apparatus for obtaining x-ray attenuation data of a subject. The apparatus includes an x-ray source which directs x-ray photons toward the subject. A detection mechanism as described above is arranged to detect x-ray photons transmitted through the subject. A readout circuit as described above reads out the response of each pixel in the detection mechanism. A weighting circuit weights the responses of each pixel according to the responses output by the readout circuit. A summation circuit sums the weighted responses of each pixel from a plurality of x-ray photons for each of the plurality of pixels.

Another aspect of the invention is a process for obtaining x-ray attenuation information of a subject, which involves the steps of directing x-ray photons towards the subject and generating a response to x-ray photons in a detection mechanism as described above. The response of each pixel is read out at a rate defined by a period wherein the likelihood of arrival of more than one x-ray photon in one pixel in one period is negligible. The read out responses are weighted according to energy levels of the individually detected x-ray photons. The weighted responses of each pixel are summed to provide a sum for each of the plurality of pixels.

Another aspect of the invention is an apparatus for obtaining x-ray attenuation information of a subject. A source of x-rays directs x-ray photons towards the subject. The apparatus then generates a response to an x-ray photon as a function of the energy of the x-ray photon, wherein the response is generated in each of a plurality of pixels in response to x-ray photons impacting the individual pixels. A device reads out the response of each pixel at a rate defined by a period wherein the likelihood of arrival of more than one x-ray photon in one pixel in one period is negligible. The read out responses are weighted by a weighting device according to energy levels of the individually detected x-ray photons. A summation device sums the weighted responses of each pixel to provide a sum for each of the plurality of pixels.

These and other aspects of the invention, along with the advantages and various embodiments thereof, will be made more apparent in the following detailed description.

DETAILED DESCRIPTION

The present invention will be more completely understood through the following detailed description which should be read in conjunction with the attached drawing in which similar reference numbers indicate similar structures.

Figure 1:
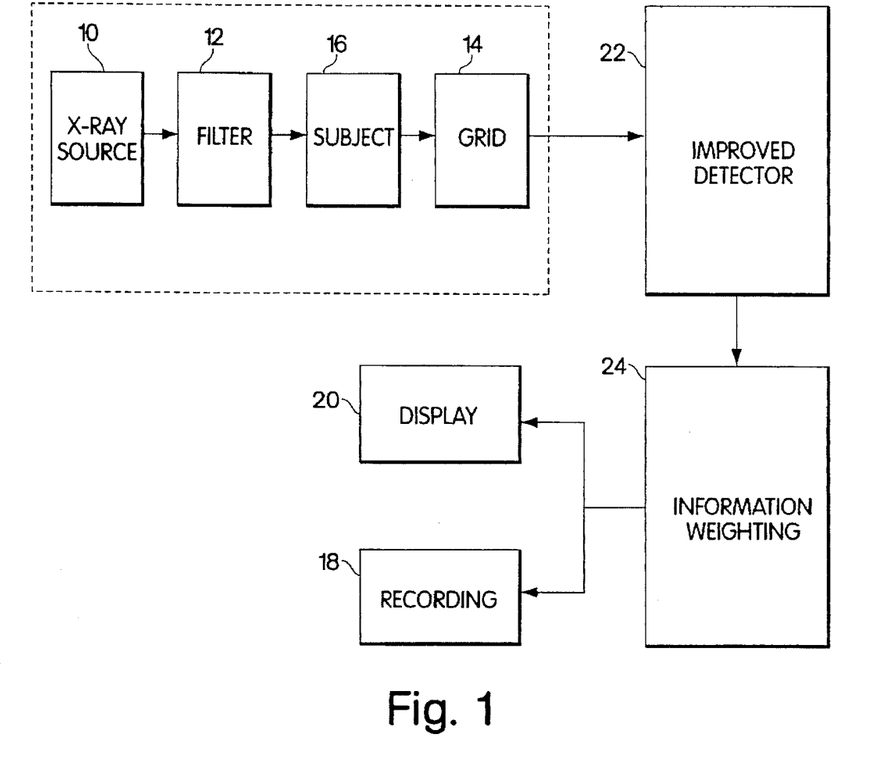
FIG. 1 is an embodiment of a system for radiographic imaging employing an x-ray detector in accordance with the present invention.

Referring now to FIG. 1, there is illustrated an embodiment of a system for radiographic imaging employing an improved x-ray detector 22 and information weighting system 24 which will be described below. The x-ray detector 22 is a form of imaging spectrometer because it effectively measures the energy spectrum of x-ray photons in a plurality of detector channels, such as picture elements (pixels) in a two-dimensional array.

In FIG. 1, an x-ray source 10, a filter 12, and a grid 14 are conventional x-ray imaging system components. A radiographic imaging system in accordance with the invention may employ any form of these conventional components. The filter 12 and/or grid 14 may be omitted. A display 20 uses the output of the information weighting system 24 to display an image to the user. Recording 18 is optional and denotes any type of recording system including but not limited to tape, disc, laser disc, or compact disc (CD) for recording image data.

In operation, the subject 16 is placed within the system, between the filter 12 and grid 14, and an x-ray exposure is made by causing the source 10 to generate x-rays in the direction of the subject 16 and detector 22. The x-ray detector 22 detects x-ray photons that pass through the subject 16. The detected results are weighted according to the energy level of each detected x-ray photon by the information weighting system 24. These results are processed and displayed on display 20 or recorded on recording device 18.

Figure 2:
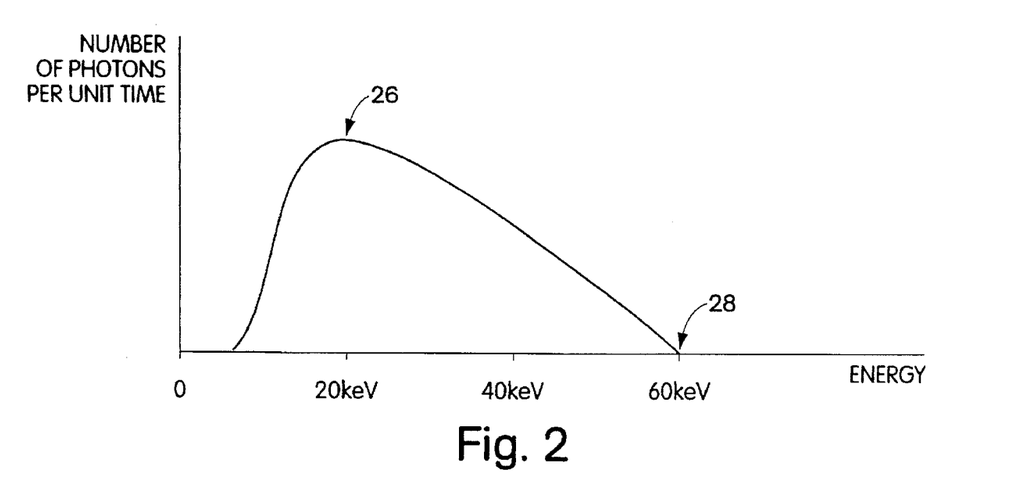
FIG. 2 is a graph illustrating the distribution of the number of x-ray photons per energy levels output by a conventional x-ray source for radiographic imaging.

It would be desirable if an x-ray source 10 could be designed to output x-ray photons primarily of one energy level; however, x-ray photons of multiple energy levels are generally output by conventional x-ray sources. Referring now to FIG. 2, the distribution of the number of x-ray photons to energy levels is shown roughly in FIG. 2, for an x-ray source with a peak voltage of 60,000 volts. For such a source, more x-ray photons are generally output at 20 KeV, as shown at 26, than at any other energy level. However, some x-ray photons may be output at energy levels around or even less than 10 KeV. Additionally, some x-ray photons of high energy levels, e.g., 40 KeV, may also be output. Some of the low energy x-ray photons will never pass through the subject. X-ray photons up to 60 KeV, the maximum photon energy 28, are possible given a source peak voltage of 60 Kilovolts. Such a source is often used for x-ray imaging of soft tissue. A source with a peak voltage around 150 KeV is often used for chest x-rays or bone x-ray imaging. Such a source provides more x-ray photons at a 50 KeV energy level than any other energy level. Some of the higher energy x-ray photons will never be attenuated by the subject. Accordingly, by measuring the energy level of individual x-ray photons, results from these x-ray photons which provide little information can be discarded or lightly weighted, whereas results from x-ray photons which relate to attenuation information can be weighted heavily. Although a filter 12 may be used to eliminate some of the higher energy x-ray photons, such filters often do not completely eliminate these effects.

Figure 3:
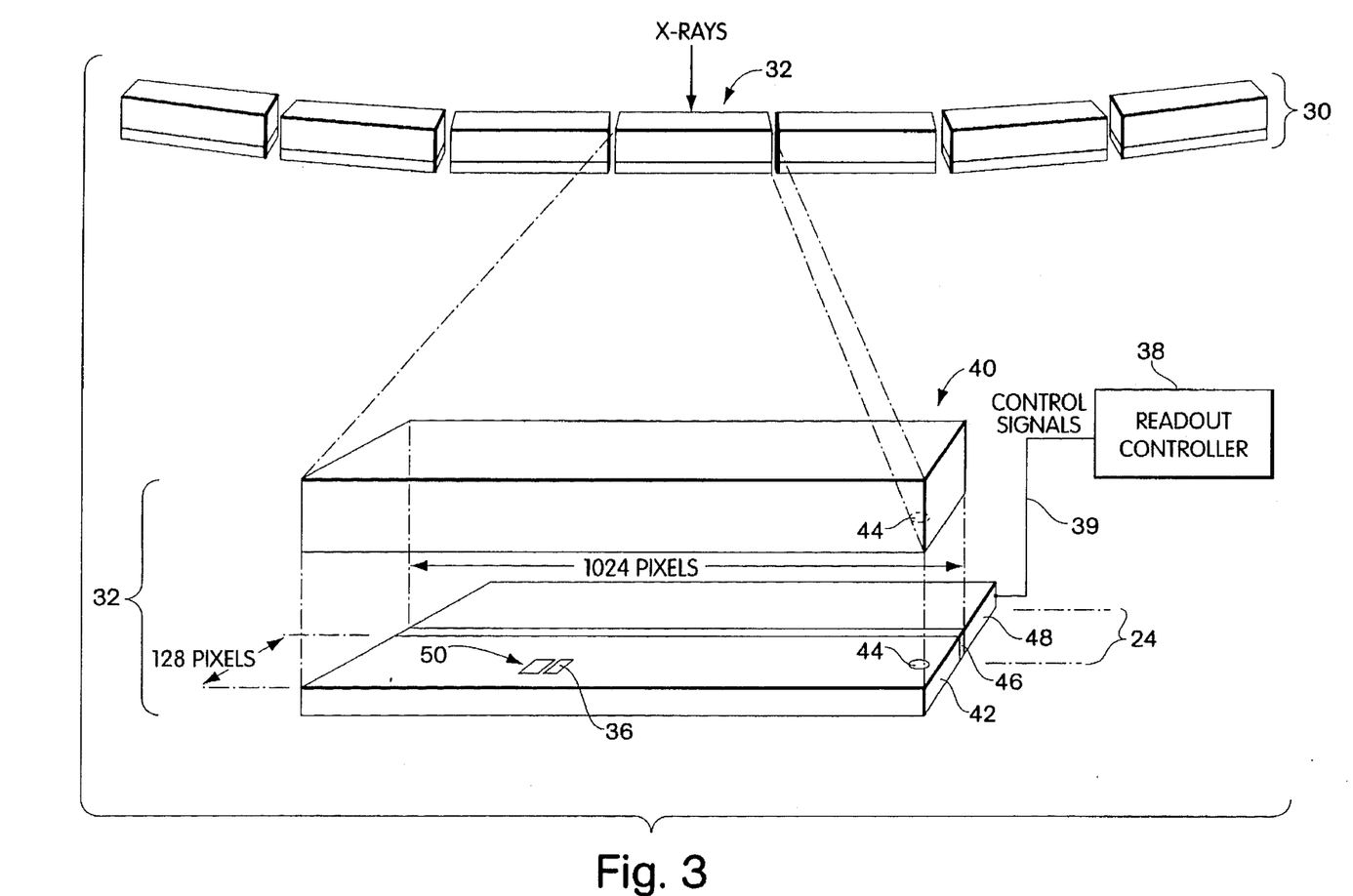
FIG. 3 is an embodiment of an x-ray detector in accordance with the present invention.

FIG. 3 shows an embodiment of the x-ray detector 22 in accordance with the invention. This embodiment is a detector array 30 in a slot scan configuration, such as used in a mammography application. The configuration in other embodiments will vary with the applications in which they are used. Other common configurations are point scan, line scan, slot scan and fixed area arrays which may or may not be subdivided. In this embodiment, the detector array 30 is a long, non-planar and narrow array of detection cells subdivided into eight rectangular detector units 32, placed end to end.

Each detector unit 32 detects x-ray photons in a number of picture elements (pixels), generally grouped into lines (or rows) of pixels. In general, the detector unit 32 generates a response in each pixel as a function of the energy of any x-ray photon that impacts the pixel. Each pixel has a separably determinable response. That is, the response of each pixel is determined primarily on the basis of the impact of an x-ray photon on that pixel, as opposed to the impact of other x-ray photons on other pixels.

A detector unit 32 is generally divided into a detection mechanism and a readout circuit. In the embodiment shown in FIG. 3, the detection mechanism is comprised of a coupling mechanism 40 and detector cells 50 in a readout integrated circuit 42, which are connected by some interconnection mechanism 44. The readout circuit is comprised of register readout cells 36 in the readout integrated circuit 42 and a readout controller 38 which is connected to the readout integrated circuit 42 by control signals 39. In the embodiment shown, the coupling mechanism is a silicon microstrip detector, the interconnection mechanism, for each pixel, are electrical conductors, such as Indium bumps, and the readout integrated circuit 42 is a charge-coupled device (CCD).

A coupling mechanism 40 is generally a material which generates a response in response to an impact of an x-ray photon. Numerous coupling mechanisms may be used, including but not limited to a non-amplifying visible light-emitter, e.g. a phosphorous screen. Such a coupling mechanism produces light as its response to an x-ray photon. The light may be, for example, in the visible, infrared or ultraviolet region of the spectrum. A light producing coupling mechanism is interconnected with the detector cells 50 in the readout integrated circuit 42 via an optical lens system or via a bundle of optical fiber, or via direct contact.

Another kind of coupling mechanism is the silicon microstrip, mentioned above, and shown in FIG. 3. Such a coupling mechanism produces a charge in response to the x-ray photons. Each pixel of such a coupling mechanism is interconnected with the detector cells 50 in the readout integrated circuit 42 typically via an electrical interconnection such as the Indium bumps described above. The interconnection mechanism may be omitted by providing direct physical contact of a pixel in the coupling mechanism with its corresponding detector cell.

As mentioned above, the readout integrated circuit 42 includes a plurality of detector cells 50, each corresponding to a pixel in the coupling mechanism 40. A plurality of register readout cells 36 are also provided, wherein each register readout cell is connected to a corresponding detector cell 50. A readout controller 38 is connected via control signals 39 to transfer the response of the detector cells 50 into their corresponding register readout cells 36. The rate at which the readout controller 38 performs this transfer is defined by a period such that the likelihood of arrival of more than one x-ray photon in one detector cell in the period is negligible. That is, the size of the pixel and the rate of arrival of the x-ray photons impinging on the detector cells defines a flux of a number of x-ray photons per pixel per millisecond. According to this average flux, a readout period can be defined that ensures, for example, that over 95% of the time the readout of a detector cell provides data on either zero or one x-ray photon. The actual level of statistical certainty desired will depend on the application. The responses readout into cells 36 are then transferred to the information weighting system 24, which in this embodiment is implemented as a plurality of weighting circuits 46 and a summation CCD 48, to be described in more detail below, along with the readout cells 36, in connection with FIG. 4.

FIG. 3 shows a particular example of a detector unit of 128 by 1024 pixels of a nominal size of 25 square micrometers, i.e., 25 μ by 25 μ (where 1 μ=$10^{-6}$ meters). It comprises a 3.2 millimeters (mm) wide by 25.6 mm long silicon microstrip detector 40 for x-ray detection, connected to an identically sized readout integrated circuit 42 via an interconnection mechanism 44. The interconnection mechanism provides an electrical connection which transfers the electrical response of the silicon microstrip to the corresponding cell of the charge-coupled device. The readout integrated circuit 42 is preferably a charge-coupled device. The interconnection mechanism may be Indium "bumps" which provide a soft metal interconnect between each pixel of the silicon microstrip detector 40 and each pixel of the readout integrated circuit 42. In this embodiment, the readout detector cells 50 are 23 μ×20 μ in size which allows room in a nominal 25 μ by 25 μ for cell separation boundaries and the interline transfer register readout cells 36. The interconnection mechanism 44 connects only to the readout detector cells 50 and not the boundaries.

By using a silicon microstrip detector 40 and CCD 42, a typical 20 KeV x-ray photon provides a charge of over 2000e- at a quantum efficiency of 0.4 while a 21 KeV x-ray photon provides a charge of over 2100e-, for a difference of 100e-, resulting in a good signal to noise ratio with which to determine the energy of the x-ray photon to better than 1 KeV resolution. An incident x-ray photon creates electron-hole pairs in the silicon microstrip detector 40 which, through the interconnection mechanism 44, results in a charge being accumulated in the detector cells 50 of the readout integrated circuit 42. This change can be read out of the charge-coupled device at a high enough rate so that the charge accumulated in the CCD corresponds to the effect of at most one x-ray photon or the pixel.

For example, in a typical slot scan design the detector array 30 is moved over the subject at a speed of 3.2 mm every 51.2 milliseconds (ms) to sweep out a 20.48 centimeters (cm) wide area of length 25.6 cm in a time of 4 seconds. The slot-scan device for mammography typically has an x-ray photon flux of 100,000 photons per square millimeter exiting the subject which results, through the slot scanning motion, in 2000 photons per square turn of detector per ms or 1.25 photons per pixel per ms. Providing sufficient readout circuitry on the readout integrated circuit 42, and the weighting and summation circuits 46 and 48 (FIG. 3), to provide a readout period of 0.040 ms or a 25 KHz readout rate ensures that over 99.88% of the time the readout provides data on either zero or one x-ray photon. Readout noise is relatively small so the measurement resulting from zero x-ray photons is small and can be discarded by the weighting circuit 46. Because less than 0.12% of the readings contain the effects of more than one x-ray photon, occasional errors in x-ray photon energy estimation will occur, but should be negligible, but can be reduced further by reducing the readout period. The readout period thus depends on the number of photons that may impact a unit area of the detector in a unit of time, for example, several to a couple thousand or more x-ray photons per square millimeter per millisecond is typical in medical applications.

Figure 4:
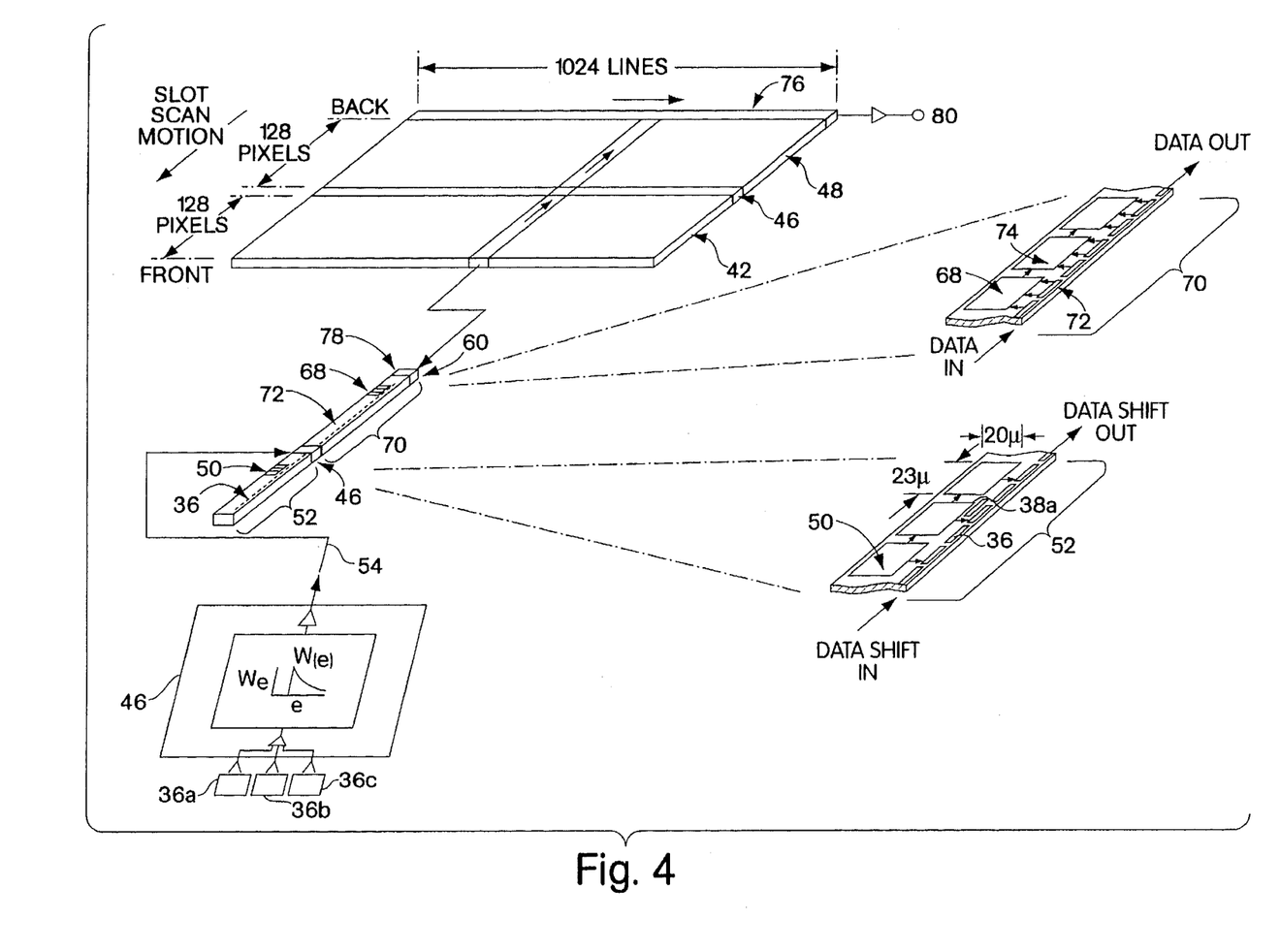
FIG. 4 is an embodiment of an information weighting circuit for use in combination with the x-ray detector of FIG. 3.

FIG. 4 illustrates a preferred embodiment of the information weighting system 24, and shows more details of the register readout cells 36 shown in FIGS. 1 and 3. The combination of the information weighting system 24 and readout cells 36 allow for energy measurements of individual x-ray photons to be read from each pixel every readout period and then weighted before they are summed to provide an output for each pixel. In this embodiment, they are implemented in the form of a large shift register provided for each line 60 or row of pixels in the combined readout integrated circuit 42 and summation circuit 48.

The register readout cells 36 will first be described. In the preferred embodiment shown in FIG. 4, one interline transfer (ILT) readout register 52 is provided for each of the 1024 lines of 128 pixels of the readout integrated circuit 42. The ILT readout register 52 is comprised of 384 readout register cells 36, three for each detection pixel 50, and is preferably implemented as a shift register. The readout register cells 36 are 3 μ by 6 μ in size. Every 0.040 msec, charge is transferred from each readout detector cell 50 to the center adjacent readout register cell 36. The readout controller 38 (FIG. 3) allows 1.6 μsec for this transfer. After this 1.6 μsec pause, the ILT readout register 60 is clocked at a 10 MHZ rate (0.1 μs period) by the readout controller 38. The readout controller may take 38.4 μs or 0.0384 ms to shift the charges from the 384 readout register cells into (and possibly through) the weighting circuit 46. Theoretically, only every third of the 384 cells contain charge measurements but the extra cells are included to allow charge spilled to adjacent cells during transfer from the detector cell and during shifting to be recaptured. At the input of the weighting circuit 46 the contents of three adjacent readout register cells 36 (shown as 36a, 36b and 36c) are summed to accomplish this recapture.

The weighting circuit 46 in this embodiment has an input connected to the last three readout register cells of the ILT readout register 52, as shown at 36a, 36b and 36c whose contents are summed. The weighting circuit performs a weighting function $W_e$ of the energy measurement e of each pixel for each time period, and provides an output, indicated at 54. The weighting circuit may be implemented using standard linear integrated circuit design techniques employing resistors, transistors, and amplifiers or other devices. The weighted energy measurements for all time periods read out are summed for each pixel by the summation circuit 48, to be described below.

In general, $W_e$ is zero below a threshold value of the energy corresponding to an x-ray photon that will not pass through the subject. For example, a 10 KeV x-ray photon generally will not pass through human subjects; thus, in radiographic imaging systems for use with humans, the threshold value will be the energy corresponding to a 10 KeV x-ray photon.

$W_e$ is approximately the shape of $$W_e = \frac{1}{e^3}$$

for higher energies. $W_e$ may be in the form of other functions also. Generally, the weighting function $W_e$ weights the measurement of each pixel by the detected energy according to the energy of the x-ray photons which are of concern to the user in terms of subject or target information and to eliminate effects of x-ray photons which provide little or no information. Thus, $W_e$ is zero below a particular energy level, e.g. 10 KeV, because x-ray photons below that level do not penetrate a human subject and reach the detector. Therefore, readings corresponding to 10 KeV or lower are due to noise and should be discarded.

The rationale for the exponentially decreasing function in the preferred embodiment is the following. The sum in a cell of the summation circuit for each pixel during each sampling period of 0.390625 μsec is a sum over energies of individual photons except in rare cases when multiple arrivals occur. Neglecting these rare cases, the sum is equivalent to a sum over energies which is $$\sum_e W_e n_e$$

where $n_e$ is the number of photons at energy e. The large number of terms in the original sum are merely regrouped and presumed for each energy. From the sum of all the measurements made, only a single sum $$\sum_e W_e n_e$$

is retained.

In sum, the contribution of low energy x-ray photons is weighted more heavily than the contribution of higher energy x-ray photons, because there is more information represented by the arrival of a low energy photon. There is more information because the x-ray attenuation is larger at lower energies. Since a major goal is to detect targets based on attenuation and to estimate this attenuation, measurements of x-ray photons having energy levels which should cause them to be attenuated should be weighted with larger values.

Figure 5A:
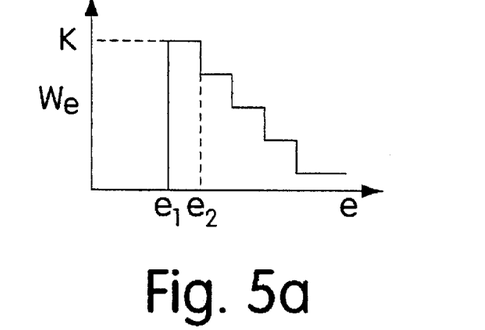
FIGS. 5a–5c are schematic illustrations of the weighting circuit 46 in FIG. 4.
Figure 5B:
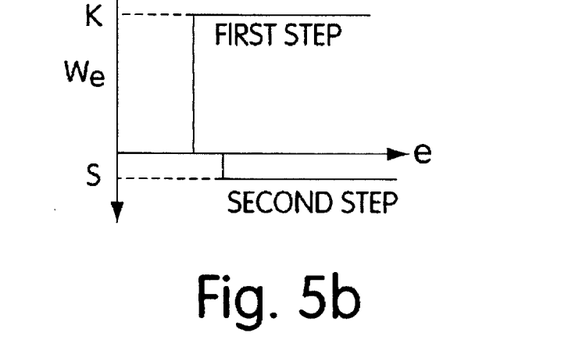
Figure 5C:
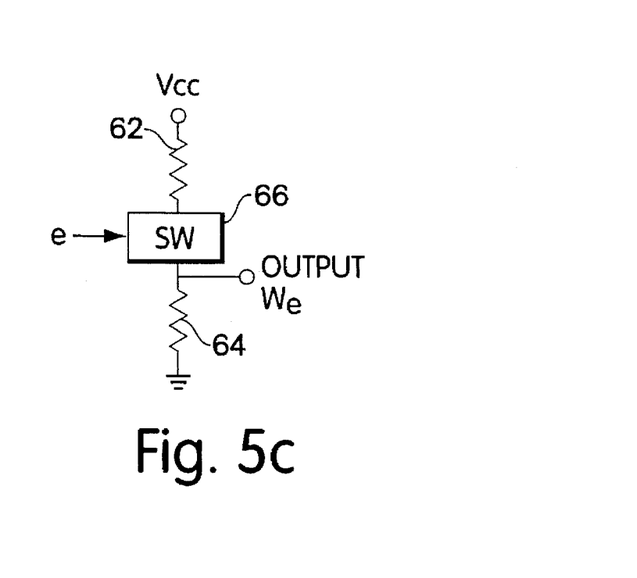

One implementation of the weighting circuit 46 employs a staircase or step approximation to perform a weighting function $W_e$ of the energy measurement e of a cell as shown in FIGS. 5a–5c. FIG. 5a shows a step approximation of W according to e. For all values of e between zero and $e_1$, $W_e$ is zero. For all values between $e_1$ and $e_2$, We is some maximum value K. Each step, two of which are explicitly shown in FIG. 5b, is synthesized with a transistor switch 66 connected with resistors 62 and 64 as shown in FIG. 5c. The output $W_e$ is at zero voltage (ground) when the switch 66 is off and at a voltage determined by the values of the internal resistance of the switch 66, the two resistors 62 and 64 and the voltage Vcc applied to resistor 62 when the switch 66 is on. The switch 66 is turned on or off dependent on the value of the input e. To generate the step approximation for the entire weighting circuit 46 the input e is applied to several switches each of which is biased to turn on at the proper value of e, and the outputs at the base of the switches are summed to generate $W_e$. FIG. 5a shows four steps in the approximation, but a much larger number can be employed using the same methods to provide a better approximation. An alternate implementation of the weighting circuit 46 may employ non-linear, no-memory amplifiers to approximate the desired curve of $W_e$ versus e.

The weighting circuit, in this embodiment, is replicated 1024 times, one for each line 60 of the combined readout integrated circuit 42 and summation circuit 48. Any reasonable latency time in the weighting circuit 46 is allowed for by simply delaying operations in the summation CCD 48 with respect to the operations in the detector CCD by the latency time, which delay is readily implemented by the readout controller.

The summation circuit 48 will now be described. The summation circuit is preferably implemented as a CCD, as shown in FIG. 4, comprised of an identical number of pixels as the readout integrated circuit. Each summation pixel 68 has a corresponding distribution register cell 72 in an interline distribution register 70, preferably implemented as a shift register, from which it receives signals to be summed. The weighting circuit 46 feeds charge to the inter-line transfer (ILT) distribution register 70 which shifts the charge through the register at the same 10 MHZ rate as the ILT readout register 52. The readout controller 38 allows for 38.4 μsec to position the charges of the ILT distribution register 70 for transfer to summation pixels 68 in the summation CCD which accumulate charge transferred to them. With 40 μsec as a readout period, 1.6 μsec remains for transfer of the charge from the ILT distribution register 70 to the summation CCD. Thus, the clocking and transfer operations on both the readout integrated circuit 42 and summation CCD use 0.040 ms. Repetition of the process at a 25 KHZ rate allows detections of (primarily) single x-ray photons to be read-out, weighted and summed.

Charge is also transferred from summation pixel 68 to adjacent summation pixel 74 in each line 60 in the combined readout integrated circuit 42 and summation circuit 48 to compensate for the mechanical motion of the slot mechanism which moves the detector array 30, and hence the detection pixels, forward to a new position every 0.4 ms. To compensate for this forward motion, charge is transferred backward along the line toward a line readout register 76, preferably implemented as a shift register. Each line 60 also has an output cell 78 in the line readout register 76. Every 0.4 ms the 1024 cells of the line readout register 76 are shifted to the output port 80 to an A/D converter (not shown). The summation pixels 68 can be shifted and the output cells 78 can be loaded at a rate of 2.5 KHz. The line readout register 76 can be read out at a rate of 2.56 MHZ and applied to the A/D converter. The output of the A/D converter can be applied to a computer system for image processing or display, or to a display system 20 or to a recording mechanism 18 for storage and later review by the user.

To summarize operation of the data readout of this embodiment, the slot detector scans in the forward direction through a 3.2 mm slot width in 51.2 ms. During this time each of 128 silicon microstrip detection pixels in a line takes 0.4 ms to pass a point on the subject and measurements are made 10 times per 0.4 ms. For a given pixel of the subject each successive set of 10 measurements is made on a detector pixel one step backward from that of the previous set. Charges for the sum of the weighted measurements are accumulated in summation pixels and shifted backward every 0.4 msec, i.e. every 10 measurements. After 1280 measurements, the sum of the charge is transferred out the back end of the summation CCD 48 to the line readout register 76 which has 1024 cells, one for each line. This transfer is also made very 0.4 ms. Since all 1024 cells are transferred to the output port 80 every 0.4 ms, the line readout register 76 is shifted at a period of 0.390625 μsec or at a 2.56 MHZ rate.

Typically, many of the 1280 measurements are small, e.g. 10 to 20e$^-$, and result in no significant output from the weighting circuit 46. These measurements correspond to readouts where no x-ray photon entered the detector at the pixel of interest in the 0.04 ms period. Larger values of energy, e.g. 2000 e$^-$, result in significant output of the weighting circuit 48 which contribute to image information. Even larger values of energy may be weighted lightly which reduces their output from the weighting circuit 46. This is appropriate since they provide less image information. By elimination or reduction of effects due to x-ray photons or noise which contribute little or no image information, the quality of the information and hence the corresponding image obtained is improved.

The system provides improved imaging or characterization because, without increasing the x-ray dose to the subject, it provides a higher probability of detecting a target when the target is present and lower probability of having a false detection when the target is absent, or, for example, provides smaller variances on estimates of size, geometrical or physical properties of a target. Additionally, with a smaller x-ray dose, this system can provide results which are the same as or improved over conventional systems. A reduction in dose which provides the same quality results makes radiographic imaging more available to more patients for diagnostic or other purposes where the side-effects of x-ray radiation are of particular concern.

Having now described a few embodiments of the invention, it should be apparent to those skilled in the art that the foregoing is merely illustrative and not limiting, having been presented by way of example only. Numerous modifications and other embodiments are within the scope of one of ordinary skill in the art. For example, many other configurations of the detector can be provided, including other scanning configurations as well as fixed arrays. Configurations of the information weighting system 24 will depend on the size of the detector array and the processing time required to read out the detector array and perform the functions of the information weighting system 24. Some embodiments may require parallel processing of the weighting and summation functions for each pixel, rather than the serial processing provided by using shift registers. In these embodiments, the configuration and timing of the processing depends on the rate at which detector cells are to be read out and the complexity of the weighting function to be used.

These and other modifications are contemplated as falling within the scope of the invention as defined by the appended claims.

What is claimed is:

1. An x-ray detector for detecting x-rays to provide a measure of energy of individual x-ray photons from a source which emits x-ray photons having a plurality of energy levels, comprising:

a detection mechanism which generates a response to an x-ray photon as a function of the energy of the x-ray photon, wherein the response is generated in each of a plurality of pixels in response to x-ray photons impacting the individual pixels;

a readout circuit connected to the detection mechanism which reads out the response of each pixel at a readout rate defined by a period, wherein the likelihood of arrival of more than one x-ray photon in one pixel in one period is negligible;

a weighting circuit having an input connected to receive responses from the readout circuit and an output providing a weighted response for each pixel; and a summation circuit connected to the output of the weighting circuit which accumulates, for each pixel, a sum of weighted responses of the pixel.

2. The x-ray detector of claim 1, wherein the readout circuit comprises:

a plurality of register readout cells, each register readout cell connected to a corresponding pixel in the detection mechanism; and a readout controller connected to transfer the response in each pixel of the detection mechanism into each register readout cell corresponding to the pixel at the readout rate.

3. The x-ray detector of claim 2, wherein the detection mechanism comprises:

a coupling mechanism which generates the response to the x-ray photon as the function of the energy of the x-ray photon, wherein the coupling mechanism is divided into picture elements, each picture element having a separably determinable response and defining the pixels of the detection mechanism;

a plurality of detector cells, each detector cell connected to a corresponding pixel in the coupling mechanism into which the response of the corresponding pixel in the coupling mechanism is transferred, wherein the register readout cells are connected to the detector cells.

4. The x-ray detector of claim 3, further comprising:

an interconnection device connected to the coupling mechanism to transfer the response between the picture elements in the coupling mechanism and the corresponding detector cells.

5. The x-ray detector of claim 1, wherein the detection mechanism comprises:

a coupling mechanism which generates the response to the x-ray photon as the function of the energy of the x-ray photon, wherein the coupling mechanism is divided into picture elements, each picture element having a separably determinable response and defining the pixels of the detection mechanism;

a plurality of detector cells, each detector cell connected to a corresponding pixel in the coupling mechanism into which the response of the corresponding pixel in the coupling mechanism is transferred, wherein the readout circuit reads the response in the detector cells.

6. The x-ray detector of claim 5, further comprising:

an interconnection device connected to the coupling mechanism to transfer the response between the picture elements in the coupling mechanism and the corresponding detector cells.

7. The x-ray detector of claim 6, wherein the interconnection device comprises Indium bumps.

8. The x-ray detector of claim 5, wherein the coupling mechanism includes a semiconductor.

9. The x-ray detector of claim 8, wherein the semiconductor is silicon.

10. The x-ray detector of claim 9, wherein the semiconductor is a silicon microstrip detector.

11. The x-ray detector of claim 5, wherein the response of the coupling mechanism is a charge.

12. The x-ray detector of claim 5, wherein the response of the coupling mechanism is light.

13. The x-ray detector of claim 12, wherein the coupling mechanism is a phosphorous screen.

14. The x-ray detector of claim 1, wherein the weighting circuit performs a weighting function according to the magnitude of the response of the pixel.

15. The x-ray detector of claim 14, wherein the weighting function weights responses indicative of an x-ray photon of lower energy more significantly than responses indicative of an x-ray photon of higher energy.

16. The x-ray detector of claim 1, wherein the readout circuit is a charge-coupled device.

17. The x-ray detector of claim 1, wherein the response of the detection mechanism is proportional to the energy of the x-ray photon.

18. The x-ray detector of claim 1, wherein the readout circuit is an integrated circuit.

19. An x-ray detector for detecting x-rays to provide a measure of energy of individual x-ray photons from a source which emits x-ray photons having a plurality of energy levels, comprising:

a detection mechanism which generates a response to an x-ray photon as a function of the energy of the x-ray photon, wherein the response is generated in each of a plurality of pixels in response to x-ray photons impacting the individual pixels;

a readout circuit connected to the detection mechanism which reads out the response of each pixel at a readout rate defined by a period, wherein the likelihood of arrival of more than one x-ray photon in one pixel in one period is negligible;

a plurality of register readout cells constructed as a shift register and wherein each register readout cell is connected to a corresponding pixel in the detection mechanism; and a readout controller connected to transfer the response in each pixel of the detection mechanism into each register readout cell corresponding to the pixel at the readout rate, wherein the readout controller transfers the response from a portion of the pixels of the detection mechanism to the corresponding register readout cells in parallel and wherein the readout controller shifts responses from the register readout cells serially through the shift register and an output register cell.

20. A method for detecting x-rays to provide a measure of energy of individual x-ray photons from a source which emits x-ray photons having a plurality of energy levels, comprising the steps of:

generating a response to an x-ray photon as a function of the energy of the x-ray photon, wherein the response is generated in each of a plurality of pixels of a detection mechanism in response to x-ray photons impacting the individual pixels;

reading out the response of each pixel at a rate defined by a period wherein the likelihood of arrival of more than one x-ray photon in one pixel in one period is negligible;

weighting each response read out of each pixel to provide a weighted response for each pixel; and accumulating, for each pixel, a sum of the weighted responses of the pixel.

21. An x-ray detector for detecting x-rays to provide a measure of energy of individual x-ray photons from a source which emits x-ray photons having a plurality of energy levels, comprising:

means for generating a response to an x-ray photon as a function of the energy of the x-ray photon, wherein the response is generated in each of a plurality of pixels in response to x-ray photons impacting the individual pixels;

means for reading out the response of each pixel at a rate defined by a period wherein the likelihood of arrival of more than one x-ray photon in one pixel in one period is negligible;

means for weighting each response read out of each pixel to provide a weighted response for each pixel; and means for accumulating, for each pixel, a sum of the weighted responses of the pixel.

22. An apparatus for obtaining x-ray attenuation information of a subject, comprising:

an x-ray source which directs x-ray photons towards a subject;

a detection mechanism arranged to detect x-ray photons transmitted through the subject and which generates a response to an x-ray photon as a function of the energy of the x-ray photon, wherein the response is generated in each of a plurality of pixels in response to x-ray photons impacting the individual pixels;

a readout circuit connected to the detection mechanism which reads out the response of each pixel at a readout rate defined by a period, wherein the likelihood of arrival of more than one x-ray photon in one pixel in one period is negligible;

a weighting circuit having an input connected to receive the responses of each pixel from the readout circuit and an output providing a weighted response for each received response; and a summation circuit connected to the output of the weighting circuit which accumulates, for each pixel, a sum of the weighted responses of the pixel.

23. The apparatus of claim 22, wherein the x-ray source provides an x-ray photon flux of several thousand x-ray photons per square millimeter per millisecond.

24. The apparatus of claim 22, wherein the x-ray source emits x-rays of energy levels primarily between 10 KeV and 150 KeV.

25. A method for obtaining x-ray attenuation information of a subject, the method comprising the steps of:

directing x-ray photons towards the subject;

generating a response to an x-ray photon as a function of the energy of the x-ray photon, wherein the response is generated in each of a plurality of pixels of a detection mechanism in response to x-ray photons impacting the individual pixels;

reading out the response of each pixel at a rate defined by a period wherein the likelihood of arrival of more than one x-ray photon in one pixel in one period is negligible weighting each response read out of each pixel to provide a weighted response for each pixel;

accumulating, for each pixel, a sum of the weighted responses of the pixel.

26. An apparatus for obtaining x-ray attenuation information of a subject, comprising:

means for directing x-ray photons towards the subject;

means for generating a response to an x-ray photon as a function of the energy of the x-ray photon, wherein the response is generated in each of a plurality of pixels in response to x-ray photons impacting the individual pixels;

means for reading out the response of each pixel at a rate defined by a period wherein the likelihood of arrival of more than one x-ray photon in one pixel in one period is negligible;

means for weighting each response read out of each pixel to provide a weighted response for each pixel; and means for accumulating, for each pixel, a sum of the weighted responses of the pixel.

27. An apparatus for obtaining x-ray attenuation information of a subject, comprising:

a controllable x-ray source for directing x-ray photons having an energy greater than 10 keV towards a subject, wherein the x-ray source provides an x-ray photon flux of more than several hundred x-ray photons per square millimeter per millisecond;

a detection mechanism arranged to detect x-ray photons transmitted through the subject and which generates a response to an x-ray photon as a function of the energy of the x-ray photon, wherein the response is generated in each of a plurality of pixels in response to x-ray photons impacting the individual pixels; and a readout circuit connected to the detection mechanism which reads out the response of each pixel at a readout rate defined by a period, wherein the likelihood of arrival of more than one x-ray photon in one pixel in one period is negligible.

28. A method for obtaining x-ray attenuation information of a subject, the method comprising the steps of:

controllably directing x-ray photons having an energy of greater than 10 KeV towards the subject at an x-ray photon flux of more than several hundred x-ray photons per square millimeter per millisecond;

generating a response to an x-ray photon as a function of the energy of the x-ray photon, wherein the response is generated in each of a plurality of pixels of a detection mechanism in response to x-ray photons impacting the individual pixels; and reading out the response of each pixel at a rate defined by a period wherein the likelihood of arrival of more than one x-ray photon in one pixel in one period is negligible.

29. An apparatus for obtaining x-ray attenuation information of a subject, comprising:

means for controllably directing x-ray photons having an energy of greater than 10 keV towards the subject at an x-ray photon flux of more than several hundred x-ray photons per square millimeter per millisecond;

means for generating a response to an x-ray photon as a function of the energy of the x-ray photon, wherein the response is generated in each of a plurality of pixels in response to x-ray photons impacting the individual pixels; and means for reading out the response of each pixel at a rate defined by a period wherein the likelihood of arrival of more than one x-ray photon in one pixel in one period is negligible.

30. An x-ray detector for detecting x-rays to provide a measure of energy of individual x-ray photons from a controllable x-ray source which emits x-ray photons having a plurality of energy levels, comprising:

a coupling mechanism which generates a charge to an x-ray photon as a function of the energy of the x-ray photon, wherein the coupling mechanism is divided into picture elements, each picture element having a separably determinable charge and defining a set of pixels;

a plurality of detector cells, each detector cell connected to a corresponding pixel in the coupling mechanism into which the charge of the corresponding pixel in the coupling mechanism is transferred; and a readout circuit connected to the plurality of detector cells which reads out the charge of each detector cell at a readout rate defined by a period, wherein the likelihood of arrival of more than one x-ray photon in one pixel of the coupling mechanism in one period is negligible.

31. The apparatus of claim 30, wherein the x-ray source emits x-rays of energy levels primarily between 10 KeV and 150 KeV.

* * * * *